C. C. WILLIAMS & W. E. FRY.
TROLLEY WHEEL.
APPLICATION FILED MAY 23, 1913.
1,084,988.
Patented Jan. 20, 1914.
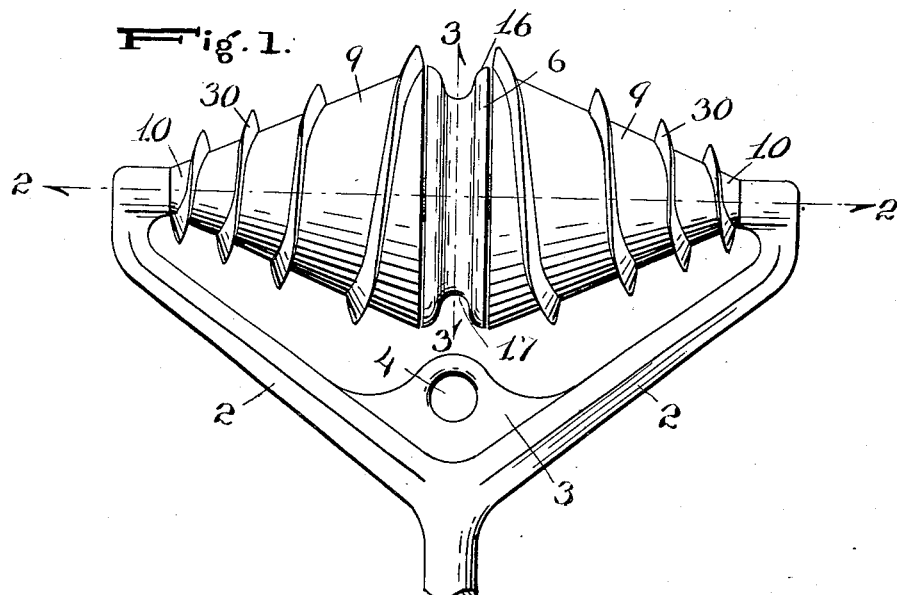
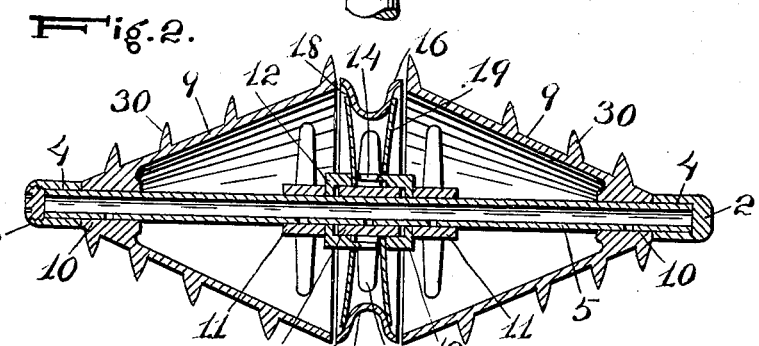
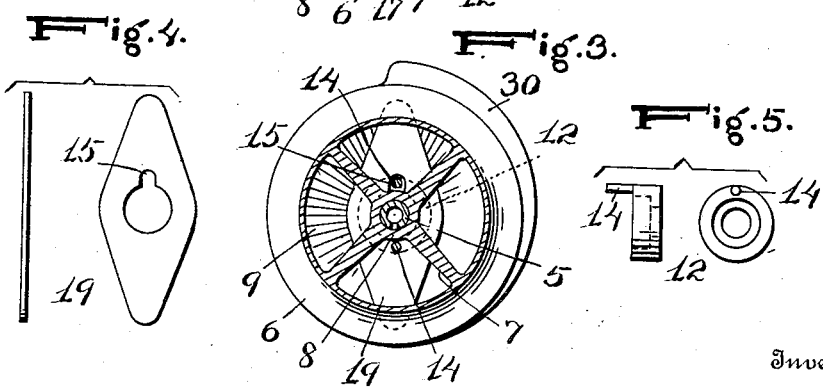
Witnesses
Stuart Hilder.
Frances W. Anderson.
Inventors
Charles C. Williams,
William E. Fry.
By E. W. Anderson & Son
their Attorneys
COLUMBIA PLANOGRAPH CO., WASHINGTON, D. C.

UNITED STATES PATENT OFFICE.

CHARLES C. WILLIAMS AND WILLIAM E. FRY, OF ANDERSON, INDIANA.

TROLLEY-WHEEL.

1,084,988. Specification of Letters Patent. Patented Jan. 20, 1914.

Application filed May 23, 1913. Serial No. 769,409.

*To all whom it may concern:*

Be it known that we, CHARLES C. WILLIAMS and WILLIAM E. FRY, citizens of the United States, residents of Anderson, in the county of Madison and State of Indiana, have made a certain new and useful Invention in Trolley-Wheels; and we declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention. Fig. 2 is a section on the line 2—2 Fig. 1. Fig. 3 is a section on the line 3—3, Fig. 1. Fig. 4 includes detail side and edge views of one of the springs. Fig. 5 includes detail side and face views of one of the collars.

The invention relates to improvements upon wire finding trolley wheels, and it consists in the novel construction and combination of parts, as hereinafter set forth.

In the accompanying drawings, illustrating the invention, the numeral 2, indicates a Y-shaped frame or fork at the end of the trolley pole, said frame having between its branches a web 3, through which is an aperture 4. The ends of the branches are curved or offset inward and are provided with bearings 4, for the ends of a hollow shaft 5, which is designed to hold oil or grease for lubricating purposes, its ends being open and abutting against closures of the fork bearings, the upper ends of the branches being rounded to avoid catching the wire.

The trolley wheel 6, is centrally arranged on the shaft 5. This wheel is of circular form having spider arms 7, connected to a hub 8, on the shaft. At each side of the wheel 6, is a hollow cone 9, having an exterior spiral rib 30. The larger end or base of the cone is open and is of the same diameter as the marginal portions of the trolley wheel, to which the ends or bases of these replacing cones are adjacent. The smaller ends 10, of these cones, bear on the shaft, and the larger ends of the cones have hubs 11, and spider arms connecting the cones thereto. Between the hubs 11, of the cones, and the hub 8, of the wheel 6, are collars 12, on the shaft. The collars 12, are recessed to receive the ends of the hub 8, and are provided with horizontal pins 14, designed to engage openings 15, in flat springs 19, loose on the hub 8, of the trolley wheel. The rim of this trolley wheel being of shell form is provided between its lateral outward curved marginal portions 16, with an inward curved circumferential bearing or "groove" 17, and the inside of the rim is of corresponding shape having a circumferential rib portion 18, against the sides of which the ends of the springs 19, bear, serving to keep the cones in relative position and prevent rattling. In this replacer the central wheel for the trolley wire turns independently of the cones, and when worn or damaged can be easily replaced. The spiral rib of each cone terminates at the base and outside the circumference of the trolley wheel, the channel of the latter being deeply recessed or set between the bases of the cones, in order to avoid, so far as practicable, displacement in running backward.

The sloping and rounded forks having their end bearings offset inward, are designed to avoid obstructive engagement with the feed wire, and to provide for replacement of the trolley wheel in normal position when approaching the span wire, should said wire get below the level of the wheel.

We claim:

1. In a trolley head, a shaft, a replacer wheel and a trolley wheel upon said shaft, an intermediate member upon said shaft, a spring device between said intermediate member and the hub of the trolley wheel, said device having at its outer end a bearing against said trolley wheel and at its inner end a bearing against and a driving engagement with said intermediate member to maintain the trolley wheel and the replacer wheel out of contact with each other, and to cause the intermediate member to turn with the trolley wheel.

2. In a trolley head, a shaft, a trolley wheel and opposite replacer wheels upon said shaft, intermediate members upon said shaft between the hubs of the replacer wheels and the hub of the trolley wheel, and spring devices between said intermediate members and the hub of the trolley wheel, said spring devices having at their outer ends bearings against the trolley wheel and at their inner ends bearings against and driving engagement with said intermediate members to maintain the trolley wheel and replacer wheels out of contact with each other and to cause the intermediate members to turn with the trolley wheel.

3. In a trolley head, a shaft, a trolley wheel and a replacer wheel upon said shaft, an intermediate collar upon said shaft between the hubs of the replacer and trolley wheels, and a bowed plate spring between said collar and the trolley wheel, said spring having at its outer end a bearing against the trolley wheel and at its inner end a bearing against and a driving engagement with said collar, to cause the intermediate collar to turn with the trolley wheel.

In testimony whereof we affix our signatures in presence of two witnesses.

CHARLES C. WILLIAMS.
   WILLIAM E. FRY.

Witnesses:
 FREDERICK VAN NUYS,
 REN. A. HOFFMANN.

---

Copies of this patent may be obtained for five cents each, by addressing the "Commissioner of Patents, Washington, D. C."